United States Patent
Rose et al.

(10) Patent No.: US 12,235,281 B2
(45) Date of Patent: Feb. 25, 2025

(54) AUTOMATED CAPPER FOR AUTOMATED BLOOD SAMPLE PROCESSING SYSTEMS

(71) Applicant: CERNER INNOVATION, INC., Kansas City, KS (US)

(72) Inventors: Joseph Eugene Rose, Grand Blanc, MI (US); Joseph Matthew Rudy, Overland Park, KS (US); Daniel Mark Kowalchuk, Port Hope (CA)

(73) Assignee: CERNER INNOVATION, INC, Kansas City, KS (US)

( * ) Notice: Subject to any disclaimer, the term of this patent is extended or adjusted under 35 U.S.C. 154(b) by 268 days.

(21) Appl. No.: 16/685,451

(22) Filed: Nov. 15, 2019

(65) Prior Publication Data

US 2020/0158746 A1  May 21, 2020

Related U.S. Application Data

(60) Provisional application No. 62/767,788, filed on Nov. 15, 2018.

(51) Int. Cl.

| | | |
|---|---|---|
| *G01N 35/04* | (2006.01) | |
| *B01L 3/00* | (2006.01) | |
| *B65B 7/28* | (2006.01) | |
| *B65G 47/00* | (2006.01) | |
| *B67B 1/04* | (2006.01) | |
| *B67B 3/064* | (2006.01) | |
| *B67B 7/00* | (2006.01) | |

(52) U.S. Cl.
CPC .......... *G01N 35/04* (2013.01); *B01L 3/50825* (2013.01); *B01L 2300/04* (2013.01); *B65B 7/28* (2013.01); *B65G 47/00* (2013.01); *B67B 1/04* (2013.01); *B67B 3/064* (2013.01); *B67B 7/00* (2013.01); *G01N 2035/0405* (2013.01)

(58) Field of Classification Search
CPC ............ G01N 35/04; G01N 2035/0405; B01L 2300/04; B01L 3/50825; B67B 3/064; B67B 7/00; B67B 1/04; B65B 7/28; B65G 47/00
See application file for complete search history.

(56) References Cited

U.S. PATENT DOCUMENTS

| | | | | |
|---|---|---|---|---|
| 4,696,144 A | * | 9/1987 | Bankuty ................. | B67B 3/206 53/317 |
| 5,095,681 A | * | 3/1992 | Choi ......................... | B67B 3/22 53/367 |
| 5,373,683 A | * | 12/1994 | Kronseder ................ | B67B 3/12 53/267 |
| 5,493,849 A | * | 2/1996 | Itoh ........................... | B67B 1/04 53/489 |

(Continued)

FOREIGN PATENT DOCUMENTS

GB             394480 A  *  6/1932  ............ B67B 3/062

*Primary Examiner* — P. Kathryn Wright
*Assistant Examiner* — Curtis A Thompson
(74) *Attorney, Agent, or Firm* — Kraguljac Law Group LLC

(57) ABSTRACT

Systems, methods, devices, and an apparatus for capping blood sample tubes after they are processed in an automated blood sample analysis processing system are provided. One aspect describes an automated blood sample tube capping assembly configured to automatically cap a plurality of sample tubes after they are processed in an automated blood sample analysis processing system.

20 Claims, 7 Drawing Sheets

(56) References Cited

U.S. PATENT DOCUMENTS

| | | | | |
|---|---|---|---|---|
| 5,846,489 A | * | 12/1998 | Bienhaus | B01L 3/50825 |
| | | | | 81/3.4 |
| 8,028,816 B1 | * | 10/2011 | Smith | G01N 35/0099 |
| | | | | 198/457.01 |
| 2003/0041560 A1 | * | 3/2003 | Kemnitz | B67B 3/2026 |
| | | | | 53/331.5 |
| 2004/0068957 A1 | * | 4/2004 | Edwards | B65B 3/04 |
| | | | | 53/268 |
| 2004/0206373 A1 | * | 10/2004 | Donoso | H01L 21/67051 |
| | | | | 134/33 |
| 2005/0017529 A1 | * | 1/2005 | Rogers | H01L 21/68707 |
| | | | | 294/103.1 |
| 2005/0047966 A1 | * | 3/2005 | Itoh | G01N 35/0099 |
| | | | | 422/547 |
| 2005/0257623 A1 | * | 11/2005 | Kitamoto | B65B 7/2821 |
| | | | | 73/761 |
| 2008/0292501 A1 | * | 11/2008 | Sattler | G01N 35/1002 |
| | | | | 422/68.1 |
| 2009/0056285 A1 | * | 3/2009 | Kramer | G01N 35/04 |
| | | | | 53/492 |
| 2009/0166153 A1 | * | 7/2009 | Dotson | B65G 51/03 |
| | | | | 198/393 |
| 2013/0111678 A1 | * | 5/2013 | Chen | H01L 21/67046 |
| | | | | 15/77 |
| 2013/0318915 A1 | * | 12/2013 | Iskarous | B65D 39/04 |
| | | | | 53/264 |
| 2016/0039615 A1 | * | 2/2016 | Otts | G01N 35/04 |
| | | | | 198/368 |

* cited by examiner

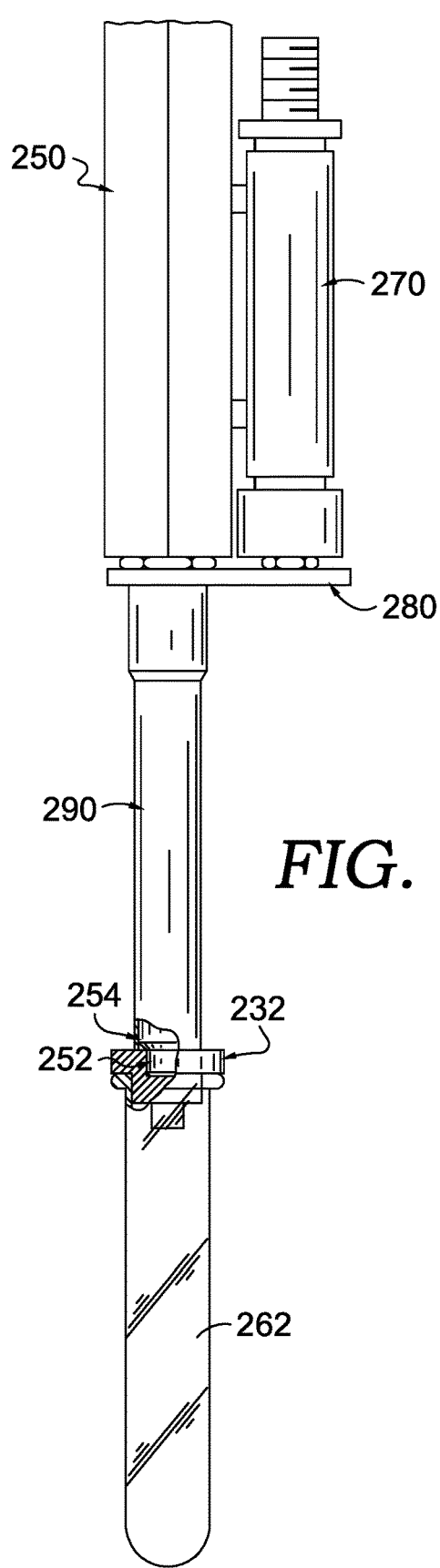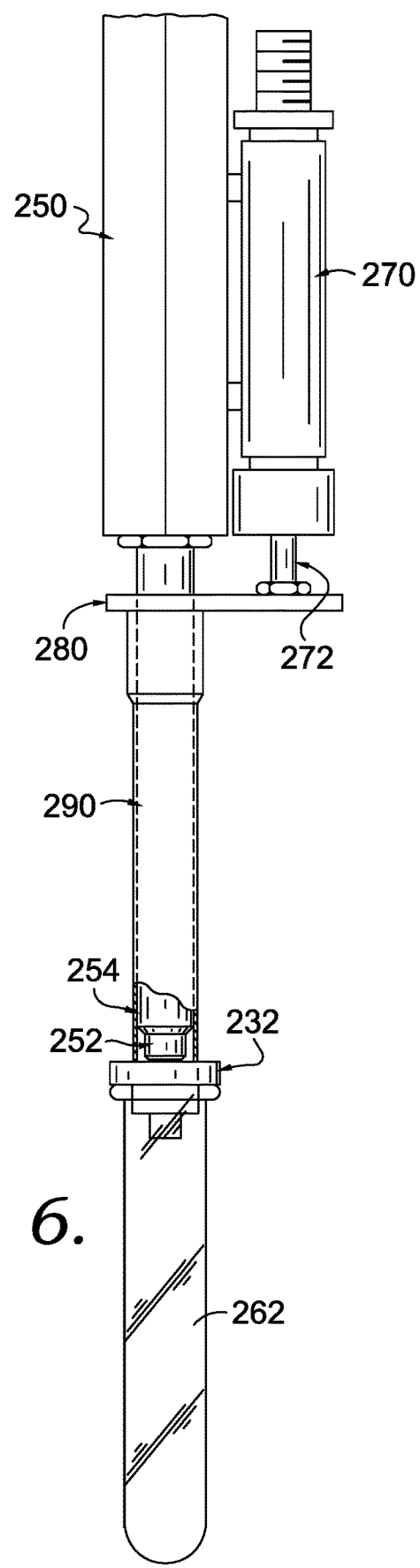
FIG. 5.
FIG. 6.

AUTOMATED CAPPER FOR AUTOMATED BLOOD SAMPLE PROCESSING SYSTEMS

CROSS-REFERENCE TO RELATED APPLICATIONS

This application claims the benefit of priority to U.S. Provisional Application No. 62/767,788, filed on Nov. 15, 2018, entitled "Automated Capper for Automated Blood Sample Processing Systems," the entirety of which is incorporated herein by reference.

BACKGROUND

Traditionally, blood processing involved several individuals that handled a given sample. Accordingly, prescreening and analysis of samples was typically performed manually. However, as systems have moved toward automation, the need for automated sample handling and processing systems for processing large quantities of samples has risen. In particular, the need for proper storage protocols require that analyzed and processed samples be recapped to avoid contamination, cross-contamination, spillage, and the like for proper storage.

SUMMARY

Embodiments herein generally relate to devices, apparatus, systems, and methods for capping blood samples in automated blood sample processing system. In one aspect, a sample tube capping device for use in an automated blood sample processing system is described herein.

BRIEF DESCRIPTION OF THE DRAWINGS

Illustrative embodiments of the present invention are described in detail below with reference to the attached drawing figures, which are incorporated by reference herein and wherein:

FIG. 5 is a close-up view of the vertically-oriented capper portion of the automated blood sample capper assembly for capping one or more blood sample tubes post-analysis after capping the blood sample tube in an engaged position, in accordance with aspects herein;

FIG. 6 is a close-up view of the vertically-oriented capper portion of the automated blood sample capper assembly for capping one or more blood sample tubes post-analysis after capping the blood sample tube in a disengaged position, in accordance with aspects herein;

DETAILED DESCRIPTION

Figure 1:
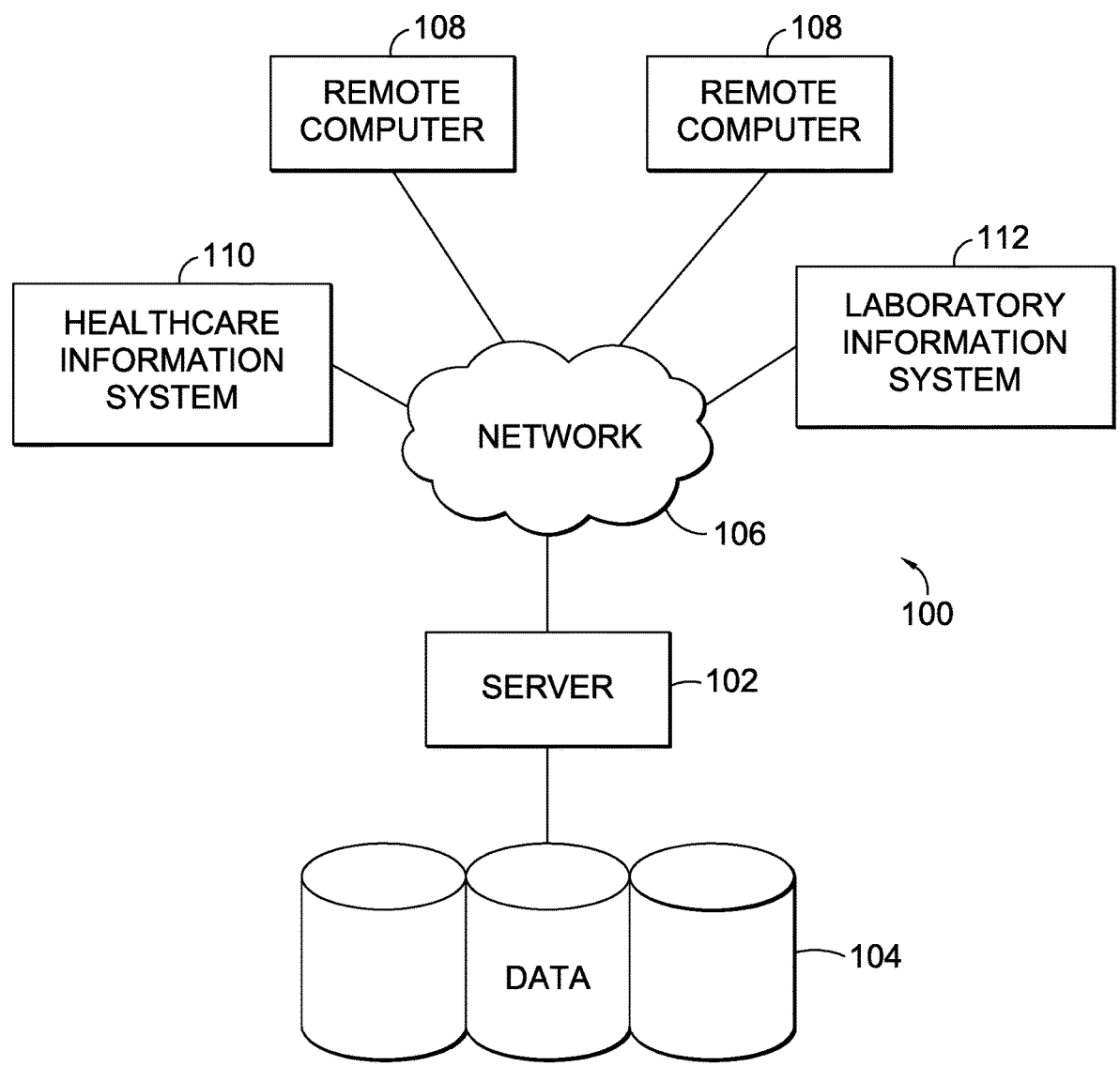
FIG. 1 is a block diagram that depicts aspects of an operating system environment suitable for practicing an embodiment of the invention.

The subject matter of the present invention is described with specificity herein to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other present or future technologies. Although the terms "step" and/or "block" might be used herein to connote different elements of methods employed, the terms should not be interpreted as implying any particular order among or between various steps herein disclosed unless and except when the order of individual steps is explicitly stated.

As briefly discussed hereinabove, aspects of this disclosure generally relate to capping blood samples processed in an automated processing system(s). This disclosure provides devices that are configured to automatically cap blood sample tubes after they have been analyzed (e.g., in an automated blood sample analyzer or processing system), for proper storage.

At a high level, automated blood sample analysis systems include sample routing tracks for moving samples throughout the systems. The systems may have automated system controls (which will generally be designated hereinafter as an "ASC") for controlling routing parameters associated with samples. The routing parameters may be set based on sample type. For example, a coagulant sample may only be routed to a coagulometer, while a complete blood count sample, or serum for biochemical testing, may be routed through several analyzers. Accordingly, the ASC may operate, in part, to send a sample to the appropriate analyzers.

Exemplary Operating System Environment

Some aspects of the present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in local and/or remote computer storage media including, by way of example only, memory storage devices.

As one skilled in the art will appreciate, embodiments of the present invention may be embodied as, among other things: a method, system, or set of instructions embodied on one or more computer-readable media. Accordingly, the embodiments may take the form of a hardware embodiment, a software embodiment, or an embodiment combining software and hardware. In one embodiment, the invention takes the form of a computer-program product that includes computer-usable instructions embodied on one or more computer-readable media devices.

Computer-readable media include both volatile and nonvolatile media, removable and non-removable media, and contemplate media readable by a database, a switch, and various other network devices. By way of example, and not limitation, computer-readable media comprise media implemented in any method or technology for storing information, including computer storage media and communication media. Examples of stored information include computer-useable instructions, data structures, program modules, and other data representations. Computer storage media examples include, but are not limited to, information-delivery media, RAM, ROM, EEPROM, flash memory or other memory technology, CD-ROM, digital versatile discs (DVDs), holographic media or other optical disc storage, magnetic cassettes, magnetic tape, magnetic disk storage, other magnetic storage devices, and other computer hardware or storage devices. These technologies can store data momentarily, temporarily, or permanently.

While aspects of the present invention may be performed by special purpose computing devices, the special purpose devices may be operational with general purpose devices and/or network configurations. Examples of well-known computing systems, environments, and/or configurations that may be suitable for use with the present invention include, by way of example only, personal computers, server computers, handheld or laptop devices, multiprocessor systems, microprocessor-based systems, set top boxes, programmable consumer electronics, network PCs, minicomputers, mainframe computers, distributed computing environments that include any of the above-mentioned systems or devices, and the like.

Referring to the drawings in general, and initially to FIG. 1 in particular, an exemplary computing system environment, on which embodiments of the present invention may be implemented is illustrated and designated generally as reference numeral 100. It will be understood and appreciated by those of ordinary skill in the art that the illustrated computing system environment 100 is merely an example of one suitable computing environment and is not intended to suggest any limitation as to the scope of use or functionality of the invention. Neither should the computing system environment 100 be interpreted as having any dependency or requirement relating to any single component or combination of components illustrated therein.

With continued reference to FIG. 1, the exemplary computing system environment 100 includes a general-purpose computing device in the form of a server 102. Components of the server 102 may include, without limitation, a processing unit, internal system memory, and a suitable system bus for coupling various system components, including database cluster 104, with the server 102. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The server 102 typically includes, or has access to, a variety of devices capable of storing computer-readable media, for instance, database cluster 104. Computer-readable media can be any available media that may be accessed by server 102, and includes volatile and nonvolatile media, as well as removable and non-removable media. Computer-readable media may be physically stored on any number of devices and/or data structures. By way of example, and not limitation, computer-readable media may include computer storage media and communication media. Computer storage media may include, without limitation, volatile and nonvolatile media, as well as removable and non-removable media implemented in any method or technology for storage of information, such as computer-readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 102. Computer storage media does not comprise signals per se. Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its evaluation criteria set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer readable media.

The computer storage media discussed above and illustrated in FIG. 1, including database cluster 104, provide storage of computer-readable instructions, data structures, program modules, and other data for the server 102. The server 102 may operate in a computer network 106 using logical connections to one or more remote computers 108. Remote computers 108 may be located at a variety of locations so that any number of devices and device types may be capable of integration on the network. The remote computers 108 may be personal computers, mobile devices, servers, routers, network PCs, peer devices, other common network nodes, or the like, and may include some or all of the components described above in relation to the server 102. The devices can be personal digital assistants or other like devices.

Exemplary computer networks 106 may include, without limitation, local area networks (LANs) and/or wide area networks (WANs). Such networking environments are commonplace in offices, enterprise-wide computer networks, intranets, and the Internet. When utilized in a WAN networking environment, the server 102 may include a modem or other means for establishing communications over the WAN, such as the Internet. In a networked environment, program modules or portions thereof may be stored in the server 102, in the database cluster 104, or on any of the remote computers 108. For example, and not by way of limitation, various application programs may reside on the memory associated with any one or more of the remote computers 108. It will be appreciated by those of ordinary skill in the art that the network connections shown are exemplary and other means of establishing a communications link between the computers (e.g., server 102 and remote computers 108) may be utilized.

In operation, a user may enter commands and information into the server 102 or convey the commands and information to the server 102 via one or more of the remote computers 108 through input devices, such as a keyboard, a pointing device (commonly referred to as a mouse), a trackball, or a touch pad. Other input devices may include, without limitation, microphones, satellite dishes, scanners, or the like. Commands and information may also be sent directly from a remote healthcare device to the server 102. In addition to a monitor, the server 102 and/or remote computers 108 may include other peripheral output devices, such as speakers and a printer.

Although many other internal components of the server 102 and the remote computers 108 are not shown, those of ordinary skill in the art will appreciate that such components and their interconnection are well known. Accordingly, additional details concerning the internal construction of the server 102 and the remote computers 108 are within the scope of this disclosure.

Exemplary computing system environment 100 may include a healthcare information system 110. The healthcare information system 110 may operate to store, receive, produce and communicate data elements related to the provision of healthcare. For example, the healthcare information system 110 may receive orders, such as those for laboratory testing of patient blood samples. The orders may be received from clinicians. Clinicians may comprise a treating physician or physicians; specialists such as surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; veterinarians; students; and the like. The remote computers 108 may have access to the healthcare information system 110. The remote computers 108 might be personal computers, servers, routers, network PCs, peer devices, other common network nodes, or the like and might comprise some or all of the elements described above in relation to the control server 102. The devices can be personal digital assistants or other like devices.

Additionally, the exemplary computing system environment 100 may include a laboratory information system 112. The laboratory information system 112 may operate to facilitate laboratory processing of the patient blood samples ordered in healthcare information system 110. For example, in one aspect, the laboratory information system 112 may receive an indication when a laboratory test is ordered for a patient. For example, when a complete blood panel is ordered for a patient, the laboratory information system 112 may receive a notification that the complete blood panel has been ordered. Additionally, when a sample is collected, the healthcare information system 110 may communicate an indication of a sample identification number or other indication of an identity of the sample and ordered tests associated with the sample. Accordingly, the laboratory information system 112 may communicate the indication to the ASC, which as discussed hereinabove, may route the sample for laboratory analysis according to the ordered tests.

In some embodiments, laboratory information system 112 is a computing system made up of one or more computing devices. In an embodiment, laboratory information system 112 includes an adaptive multi-agent operating system, but it will be appreciated that laboratory information system 112 may also take the form of an adaptive single agent system or a non-agent system. Laboratory information system 112 may be a distributed computing system, a data processing system, a centralized computing system, a single computer such as a desktop or laptop computer or a networked computing system.

In an embodiment, laboratory information system 112 is a multi-agent computer system with agents. A multi-agent system may be used to address the issues of distributed intelligence and interaction by providing the capability to design and implement complex applications using formal modeling to solve complex problems and divide and conquer these problem spaces. Whereas object-oriented systems comprise objects communicating with other objects using procedural messaging, agent-oriented systems use agents based on beliefs, capabilities and choices that communicate via declarative messaging and use abstractions to allow for future adaptations and flexibility. An agent has its own thread of control, which promotes the concept of autonomy.

Sample Tube Capper Assembly

Figure 2:
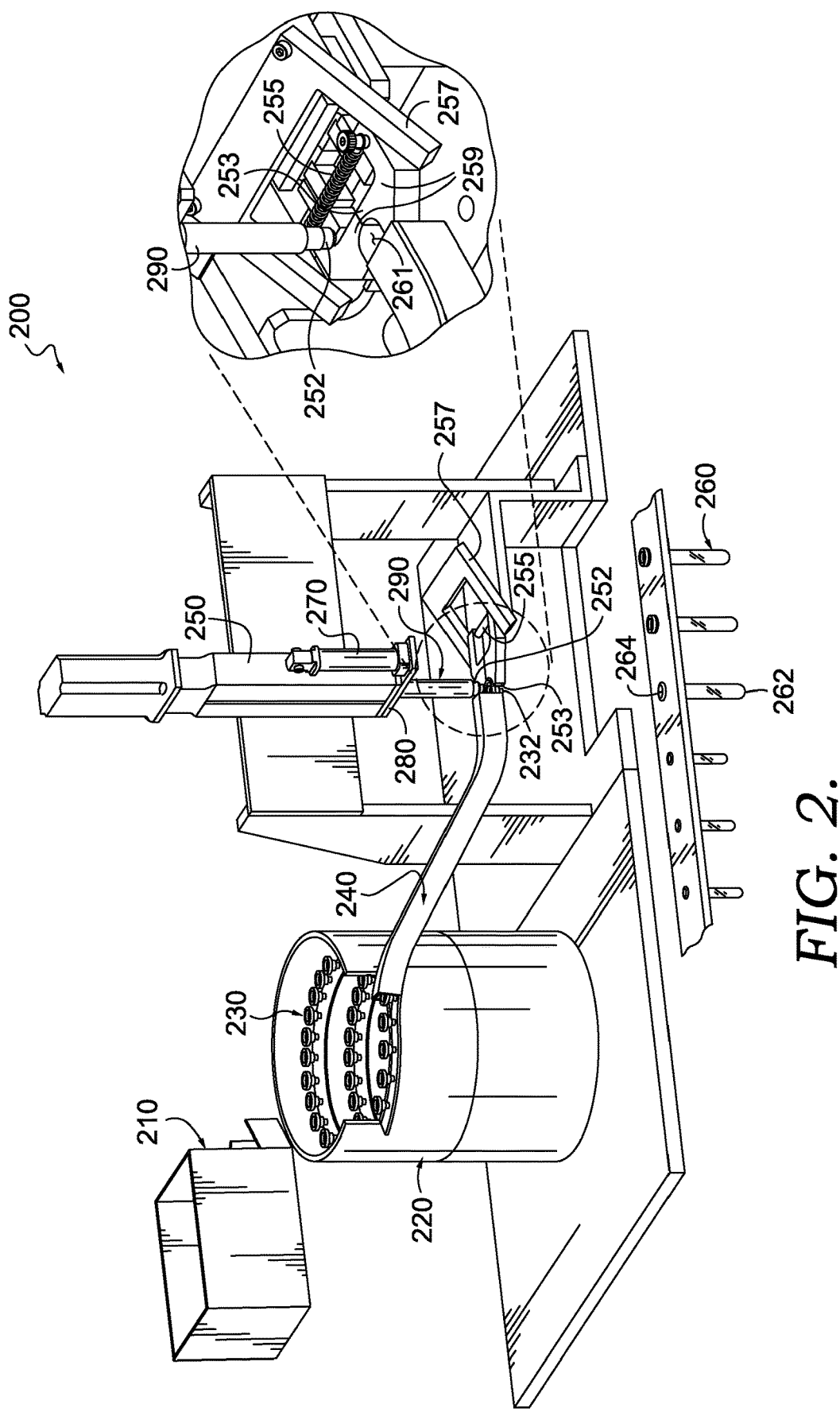
FIG. 2 is a perspective view of a portion of a blood sample analysis device showing an automated blood sample capper assembly for capping one or more blood sample tubes post-analysis, in accordance with aspects herein.

Embodiments herein relate to a capper assembly 200 for automatically capping one or more blood sample tubes via a vertically-oriented capper portion 250, shown in FIG. 2. The capper assembly 200 may comprise a receptacle 210 for receiving a plurality of caps 230, a bowl 220 for holding and organizing the plurality of caps 230, a track 240 for transporting the caps 230 to the vertically-oriented capper portion 250, the vertically-oriented capper portion 250 being comprised of at least a capper tip 252 configured to engage, for example, a cap 232 for capping a blood sample tube 262 of a plurality of sample tubes 260, as shown in FIG. 2. The plurality of caps 230 may be universal caps, meaning that they may be configured to fit (i.e. securely cap) multiple sized sample tubes by comprising several capping levels.

Figure 3:
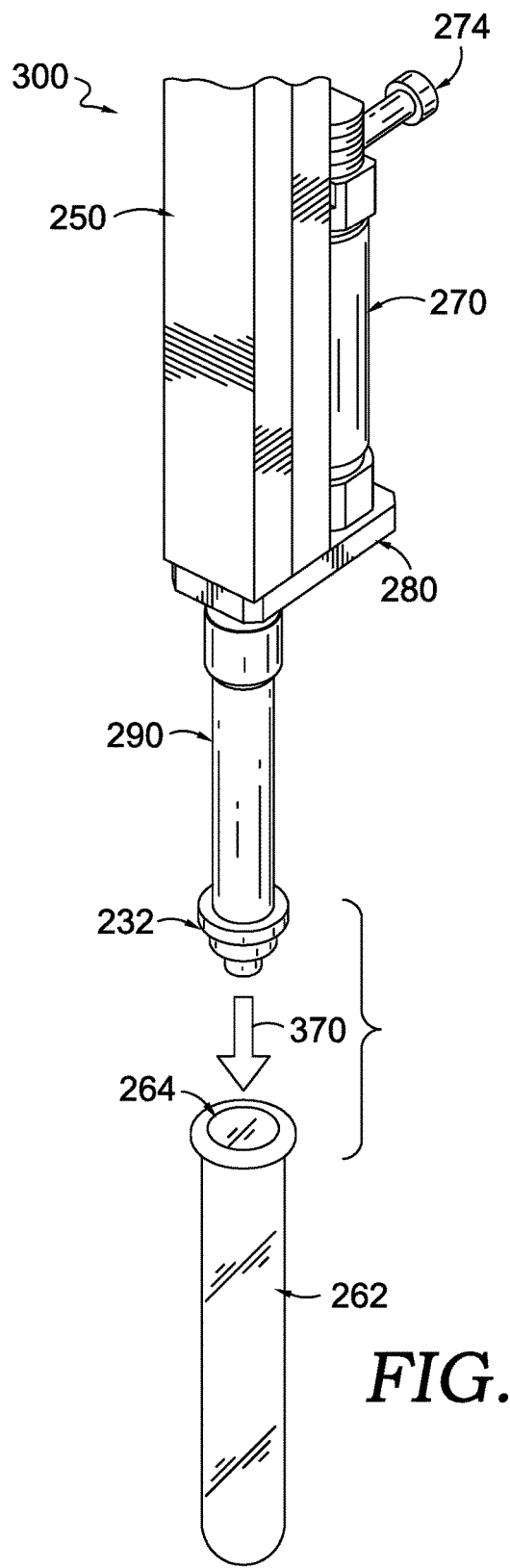
FIG. 3 is a close-up view of the vertically-oriented capper portion of the automated blood sample capper assembly for capping one or more blood sample tubes post-analysis prior to capping a blood sample tube, in accordance with aspects herein.

FIG. 3 shows a close up view 300 of the vertically-oriented capper portion 250 in FIG. 2. As can be seen in the close up view 300, the vertically-oriented capper portion 250 is comprised of at least an air cylinder 270, a capper sleeve 290 that extends over a capper rod 254 with a capper tip 252 (shown in FIGS. 5-10), and a bracket 280 configured to secure a pneumatic piston rod 272 (shown in FIG. 6) of the air cylinder 270 and the capper sleeve 290 in a fixed position relative to one another. This will become more apparent with reference to FIG. 10, where a deconstructed view 1000 of the vertically-oriented capper portion 250 in FIG. 2, is shown. Although the sample tube capper assembly is 200 is described herein as being actuated by a pneumatic piston rod 272 and air cylinder 270 that are actuated with compressed air, it is contemplated that the actuating component for the capper assembly 200 may be replaced by other setups that would be capable of providing the same linear motion. Some illustrative examples of alternative setups may include, for example, electric motors providing power to, for instance, a belt drive, or for turning a leadscrew. Other examples may include a hydraulic based system, and the like.

Figure 9:
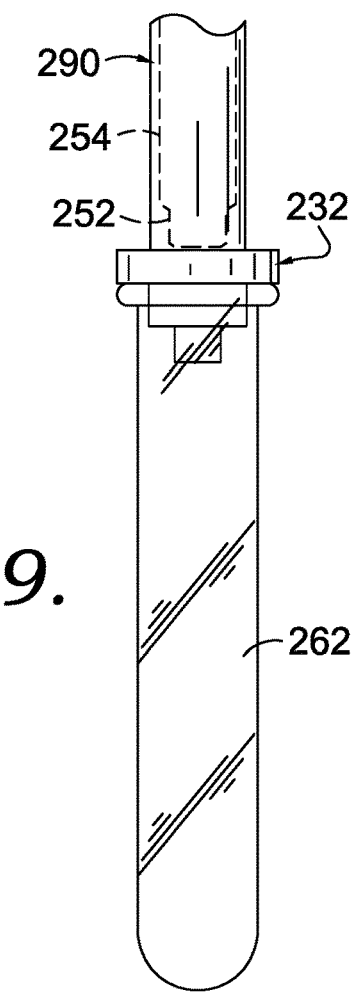
Figure 10:
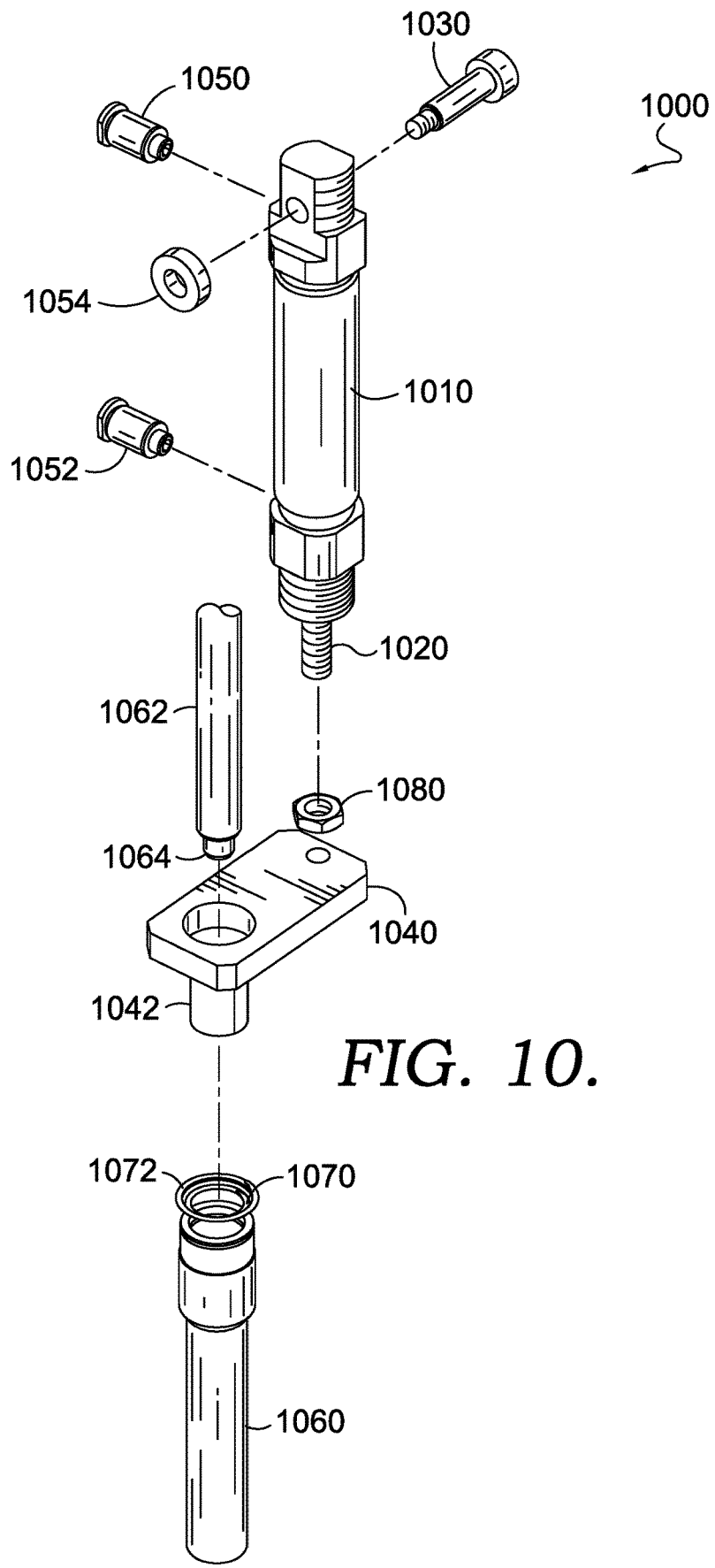
FIG. 10 is a deconstructed view of the vertically-oriented capper portion of the automated blood sample capper assembly for capping one or more blood sample tubes post-analysis after capping the blood sample tube, in accordance with aspects herein.

Generally, the vertically-oriented capper portion 250 is substantially vertically oriented, as shown in FIG. 2, such that a profile of the vertically-oriented capper portion 250 corresponds to a profile of a sample tube (not shown in FIG. 10). In one aspect, as shown in the deconstructed view 1000 of FIG. 10, the vertically-oriented capper portion 250 in FIG. 2 includes at least an air cylinder 1010 having a pneumatic piston rod 1020, a bracket 1040 having a sleeve bearing 1042 configured to engage a capper sleeve 1060, which is secured to the sleeve bearing 1042 via an internal retaining ring 1070 and an external retaining ring 1072. The air cylinder 1010 is configured to be connected to a compressed air source to actuate the pneumatic piston rod 1020 that is secured to the bracket 1040 by, for example, a hex jam nut 1080. The air cylinder 1010 further comprises push fittings 1050 and 1052, a shoulder screw 1030, and an unthreaded spacer 1054. The shoulder screw 1030 and the unthreaded spacer 1052 position and secure the air cylinder 1010 in a fixed position relative to the vertically-oriented capper portion 250 in FIG. 2, as will become more apparent with respect to FIGS. 3-9. The capper sleeve 1060 is configured to envelope a capper rod 1062. The capper rod 1062 comprises a capper tip 1064 that is configured to engage each of the plurality of caps 230 shown in FIG. 2, as an example.

In FIG. 2, each of the plurality of caps 230 comprise a cavity where the capper tip 252 is configured to snugly fit into the cap cavity such that each cap of the plurality of caps 230 is engaged by the capper tip 252 and is transferred from a cap track 240, as shown in FIG. 2, onto an uncapped blood sample tube, for example, sample tube 262 of a plurality of blood sample tubes 260. Once the cap, for example cap 232, is securely pushed and engaged with an open end of the uncapped blood sample tube 262 to seal the contents of the blood sample tube, the cap 232 is pushed off of the capper tip 252 by the capper sleeve 290 of the capper rod 254 associated with the vertically-oriented capper portion 250 of the capper assembly 200 in FIG. 2.

Figure 4:
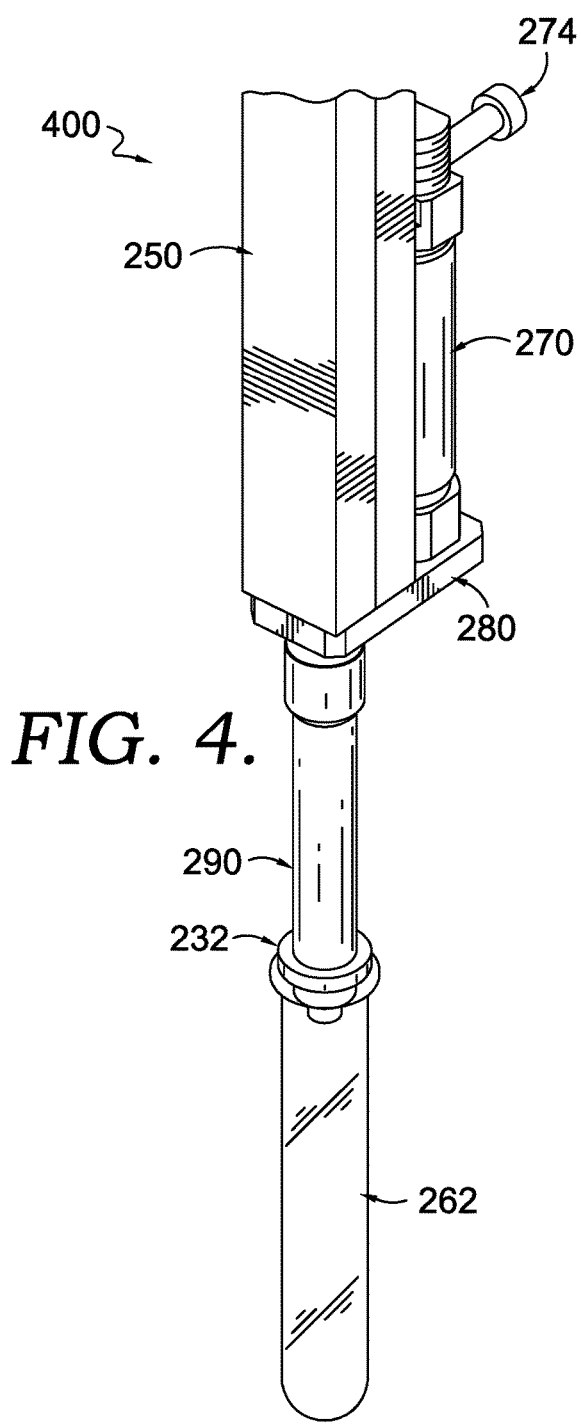
FIG. 4 is a close-up view of the vertically-oriented capper portion of the automated blood sample capper assembly for capping one or more blood sample tubes post-analysis after capping the blood sample tube, in accordance with aspects herein.

Moving on to FIGS. 3-9, as shown in FIGS. 5 and 6, the capper rod 254 is configured to fit inside of the capper sleeve 290. When assembled, (as will be more apparent from FIGS. 3-9), the capper rod 254 and the air cylinder 270 are stationary with respect to the vertically-oriented capper portion 250. FIG. 3 shows a close up view of an engage mode 300 of the vertically-oriented capper portion 250, it can be seen that the air cylinder 270 is secured to the vertically-oriented capper portion 250 by the shoulder screw 274. Further, the pneumatic piston rod 272 (shown in FIG. 6) of air cylinder 270, as described above with reference to FIG. 10, is secured to the bracket 280. When the vertically-oriented capper portion 250 is in an engage mode 300, the capper tip 252 of the vertically-oriented capper portion 250 is engaged with a cap 232. Once the cap 232 is aligned with an opening 264 of a sample tube 262, the vertically-oriented capper portion 250 comes down in a downward motion 370 to push the cap 232 into the opening 264 of the sample tube 262, as shown in FIG. 4, which depicts a close up view 400 of the vertically-oriented capper portion 250 as it is capping a sample tube 262 with cap 232.

Continuing onto FIG. 5, once the cap 232 is securely engaged with the sample tube 262, the pneumatic piston rod 272 of the air cylinder 270 is actuated by pressurizing the air cylinder 270 with compressed air in a first direction so that the pneumatic piston rod 272 is pushed in the first direction to exert a downward force on the bracket 280, as shown in FIG. 6, which in turn exerts a downward force on the capper sleeve 290. The capper sleeve 290 in turn, applies downward force onto the cap 232. Then, the cap 232 is pushed off of the capper tip 252 by the capper sleeve 290, breaking the connection of the cap 232 with the capper tip 252, thereby releasing the cap 232 from the capper tip 252 so that the cap 232 remains engaged with the sample tube 262. FIGS. 7A-9 offer alternative views where only the sample tube 262, the cap 232, the capper rod 254 with the capper tip 252, and the capper sleeve 290 are shown, performing the action described above with reference to FIGS. 5 and 6. Once the cap 232 is disengaged, the air cylinder 270 is pressurized with compressed air in a second direction so that the pneumatic piston rod 272 is pushed in a second direction opposite to the first direction, which causes the pneumatic piston rod 272 to retract, which in turn releases the force applied onto the bracket 280, which also allows the capper sleeve 290 to retract, exposing the capper tip 252, returning the vertically-oriented capper portion 250 to its engage mode 300 so that the vertically-oriented capper portion 250 can be ready for engaging the next cap. The air cylinder 270 is equipped with exhaust holes to release the compressed air from the air cylinder 270 when the air cylinder 270 is pressurized in the first direction or in the second direction, respectively as needed.

Figure 7A:
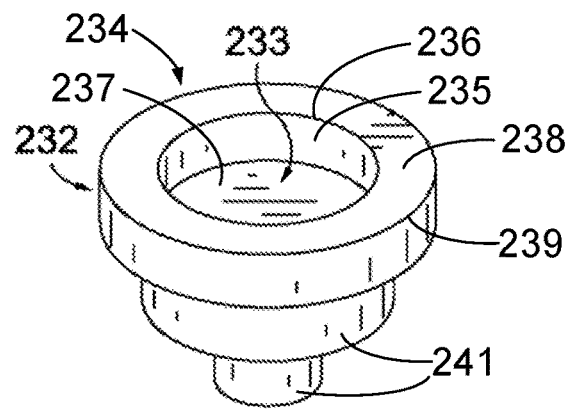
FIGS. 7A-9 depict a tip portion of the automated blood sample capper assembly for capping one or more blood sample tubes post-analysis in action, in accordance with aspects herein.
Figure 7B:
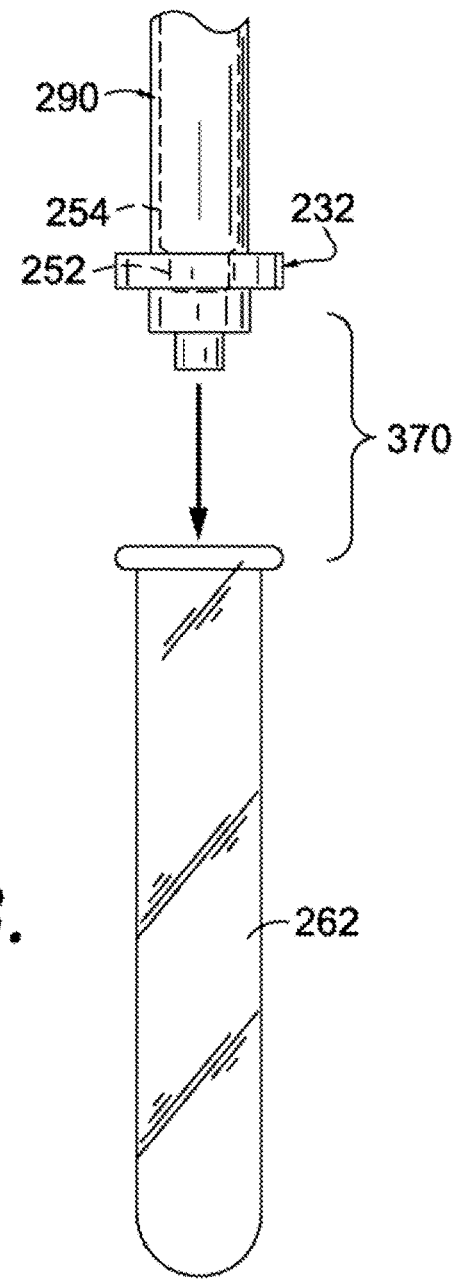
Figure 8:
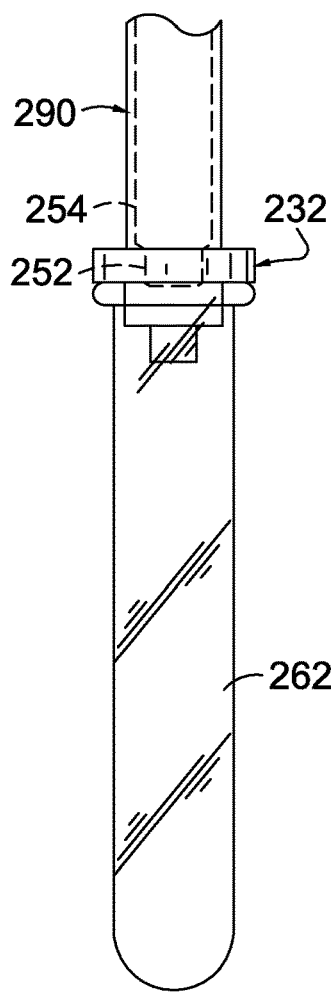

FIG. 7A shows one embodiment of a cap 232. Cap 232 includes a cap cavity 233. Cap cavity 233 is within a top 234 of cap 232. Cap cavity 233 has (in other words, is defined by) an inner surface 235 (or wall surface) along an inner diameter 236 and a floor surface 237 offset downward from the top 234 of cap 232. In one embodiment, inner surface 235 is free of inward protrusions. In one embodiment, inner surface 235 is cylindrical. In one embodiment, inner surface 235 is configured to fit snugly around an outer surface of capper tip 252. Cap 232 has an annular upper surface 238 between inner diameter 236 and an outer diameter 239. Cap 232 has one or more outer surfaces 241 configured to engage with an opening 264 in an open end of a sample tube 262. In one embodiment, cap 232 has a plurality of outer surfaces 241 at a plurality of capping levels that are configured to fit sample tubes 262 of various sizes. In one embodiment, outer surfaces 241 are cylindrical.

In additional embodiments, a method is provided for automated capping of one or more samples. The method can be performed upon initiation of a set of instructions stored, for instance, on one or more computer storage media. Initially, one or more caps, such as cap 232, can be identified by a sensing component (not shown). The sensing component may be one or more sensors or any other means to identify the presence or movement of one or more caps. The caps can, for instance, be sensed as they traverse the cap track 240. Alternatively, the caps can be identified at an initiation location. The initiation location can be a location that is a predetermined distance from where the capper tip 252 is located along the cap track 240. The predetermined distance can be an amount of distance determined to be necessary in order for the capper portion 250 to perform the steps necessary (as described below) to cause the cap 232 to engage with the opening 264 of the sample tube 262.

In particular, the cap 232 can be received from the cap track 240 and can be sensed by one or more sensing devices such as, for example, a sensor 257 (e.g., a thru beam sensor) at a cap retaining mechanism 253. The cap retaining mechanism 253 may be comprised of, for example, two discrete gripper fingers 259 that cooperate to form a cavity 261 having a profile that fits the cap such that the cap is held in an upright position (i.e., with a cap cavity 233 facing the capper tip 252 such that the capper tip 252 is ready to engage with the cap cavity 233 of cap 232). The gripper fingers 259 are mounted on separate axes and held closed by a spring loaded mechanism. The spring 255, for example, is configured to provide enough tension to keep the gripping fingers 259 closed while the cap 232 is held in position to engage the capper tip 252. In other words, the spring 255 is configured to provide an adequate amount of spring force so that the gripper fingers remain closed holding the cap 232 in position to be engaged with the capper tip 252, and once engaged, allow the gripper fingers 259 to open sufficiently to allow the cap 232 to continue on its trajectory toward, for example, sample tube 262, for capping the sample tube 262. The spring 255 is positioned a predetermined distance away from the cavity 261 of the cap retaining mechanism 253. In accordance with aspects herein, the cap 232 can be sensed (e.g., detected, identified, etc.) when the cap cavity 233 (shown at FIG. 7A) of the cap 232 is directly aligned with capper tip 252 or when the cap is a predetermine distance from where the capper tip 252 is located along the cap track 240. Once the cap 232 is detected, the capper tip 252 can be brought down toward the cap cavity 233 to snugly engage the cap cavity 233.

As described briefly above, once engaged, the cap 232 may be may be aligned with opening 264 of the sample tube 262 for capping the sample tube 264. Specifically, once the capper tip 252 of the vertically-oriented capper portion 250 is aligned with the opening 264 of the sample tube 262, the vertically-oriented capper portion 250 may come down in a downward motion 370 to push the cap 232 into the opening 264 to cap the sample tube 262, as shown in FIGS. 3, 4, 5, 7B, and 8, which depict a close up view, for example view 400 of FIG. 4, of the vertically-oriented capper portion 250 as it is capping a sample tube 262 with cap 232. Once the cap 232 is engaged with the opening 264 of the sample tube 262, the pneumatic piston rod 272 of the air cylinder 270 may be actuated by pressurizing the air cylinder 270 with compressed air in a first direction so that the pneumatic piston rod 272 is pushed in the first direction to exert a downward force on the bracket 280, as shown in FIGS. 6 and 9, which in turn exerts a downward force on the capper sleeve 290. The capper sleeve 290 in turn, may apply a downward force onto the cap 232 so that the capper sleeve 290 extends beyond the capper tip 252 concealing the capper tip 252. Thus, the cap 232 may be pushed off/disengaged from the capper tip 252 so that the cap 232 remains engaged with the sample tube 262. Once the cap 232 is disengaged from the capper tip 252, the air cylinder 270 may be pressurized with compressed air in a second direction that is opposite to the first direction so that the pneumatic piston rod 272 is pushed in the second direction, which may cause the pneumatic piston rod 272 to retract, which in turn may release the force applied onto the bracket 280, which may allow the capper sleeve 290 to retract, exposing the capper tip 252 again, returning the vertically-oriented capper portion 250 to its engage mode 300 so that the vertically-oriented capper portion 250 may be made ready for engaging a subsequent cap. The above-recited steps may be performed in sequence such that a plurality of caps 232 are detected and automatically applied to one or more sample tubes 262.

Many different arrangements of the various components depicted, as well as components not shown, are possible without departing from the spirit and scope of the present invention. Embodiments of the invention have been described with the intent to be illustrative rather than restrictive. Alternative embodiments may become apparent to those skilled in the art that do not depart from its scope. A skilled artisan may develop alternative means of implementing the aforementioned improvements without departing from the scope of the invention.

Further, it may be understood that certain features and subcombinations are of utility, may be employed without reference to other features and subcombinations, and are contemplated within the scope of the claims. Not all steps listed in the various figures need be carried out in the specific order described.

What is claimed:

1. A sample tube capping device comprising:
   a cap comprising a cap cavity having a cylindrical inner surface along an inner diameter in a top of the cap, and a cap surface between the inner diameter and an outer diameter on the top of the cap;
   a cap retaining mechanism that includes two discrete, gripper fingers that are mounted on separate axes and held closed by a spring;
   a sensor configured to detect the cap retained within the cap retaining mechanism;
   a vertically-oriented capper portion;
   a capper rod comprising a capper tip having a cylindrical outer surface aligned with the cap retaining mechanism, wherein in an engage mode the capper rod is configured to engage the cylindrical outer surface of the capper tip snugly against the cylindrical inner surface of the cap cavity of the cap retained within the cap retaining mechanism and push the cap with the cap cavity engaged to the capper tip into an open end of a sample tube, and wherein the spring is configured with a tension that holds the cap in place between the gripper fingers until the cap cavity and capper tip are engaged, and that allows the gripper fingers to be pivoted open by passage of the engaged cap;
   a moveable capper sleeve enveloping the capper rod;
   an air cylinder comprising a pneumatic piston rod; and
   a bracket securing the pneumatic piston rod and the moveable capper sleeve in a fixed position relative to one another,
   wherein the air cylinder and the capper rod are affixed to and stationary with respect to the vertically-oriented capper portion, and
   wherein the pneumatic piston rod is configured to push the moveable capper sleeve downward against the cap surface to disengage the cap cavity of the cap from the capper tip of the capper rod and maintain a seal of the cap on the open end of the sample tube when a disengage mode is actuated.

2. The sample tube capping device of claim 1, wherein in the engage mode, the capper tip extends beyond the moveable capper sleeve to engage the cap from the cap retaining mechanism at an end of a cap track and push the cap onto the sample tube.

3. The sample tube capping device of claim 2, wherein the moveable capper sleeve is configured to receive a downward force from the pneumatic piston rod when the disengage mode is actuated.

4. The sample tube capping device of claim 1, wherein in the disengage mode, the moveable capper sleeve is pushed down such that the moveable capper sleeve extends beyond and conceals the capper tip of the capper rod.

5. The sample tube capping device of claim 1, wherein the cap comprises multiple capping levels.

6. The sample tube capping device of claim 1, wherein the pneumatic piston rod is actuated by pressurizing the air cylinder with compressed air.

7. The sample tube capping device of claim 1, wherein in the disengage mode, the moveable capper sleeve is pushed down such that the moveable capper sleeve extends beyond and conceals the capper tip of the capper rod to engage the cap with the sample tube and break a connection of the cap with the capper tip.

8. The sample tube capping device of claim 1, wherein the sensor is a thru beam sensor positioned around an outside of the cap retaining mechanism.

9. A capper assembly comprising:
   a cap receptacle portion;
   a cap bowl portion;
   a cap comprising a cap cavity having a cylindrical inner surface along an inner diameter in a top of the cap, and a cap surface between the inner diameter and an outer diameter on the top of the cap;
   a track portion;

a cap retaining mechanism that includes two discrete, flat gripper fingers that are mounted on separate axes and held closed by a spring;

a thru-beam sensor configured to detect the cap retained within the cap retaining mechanism;

a vertically-oriented capper portion;

a capper rod comprising a capper tip having a cylindrical outer surface aligned with the cap retaining mechanism, wherein in an engage mode the capper rod is configured to engage the cylindrical outer surface of the capper tip snugly against the cylindrical inner surface of the cap cavity of the cap retained within the cap retaining mechanism and push the cap with the cylindrical inner surface of the cap cavity engaged to the capper tip into an open end of a sample tube, and wherein the spring is configured with a tension that holds the cap in place between the gripper fingers until the cap cavity and capper tip are engaged, and that allows the gripper fingers to be pivoted open by passage of the engaged cap;

a moveable capper sleeve enclosing the capper rod;

an air cylinder comprising a pneumatic piston rod; and a bracket securing the pneumatic piston rod and the moveable capper sleeve in a fixed position relative to one another, wherein the air cylinder and the capper rod are affixed to and are stationary with respect to the vertically-oriented capper portion, and wherein the pneumatic piston rod is configured to push the moveable capper sleeve downward against the cap surface to disengage the cap cavity of the cap from the capper tip of the capper rod and maintain a seal of the cap on the open end of the sample tube when a disengage mode is actuated.

10. The capper assembly of claim 9, wherein the cap bowl portion is configured to receive a plurality of caps from the cap receptacle portion and organize the plurality of caps received.

11. The capper assembly of claim 10, wherein the cap and each cap in the plurality of caps comprises multiple capping levels.

12. The capper assembly of claim 9, wherein the track portion is configured to receive and transport a plurality of caps from the cap bowl portion to the vertically-oriented capper portion.

13. The capper assembly of claim 9, wherein in the engage mode, the capper tip of the capper rod extends beyond the moveable capper sleeve to engage the cap from the cap retaining mechanism at an end of the track portion and push the cap onto the sample tube.

14. The capper assembly of claim 13, wherein the moveable capper sleeve is configured to receive a downward force from the pneumatic piston rod when the disengage mode is actuated.

15. The capper assembly of claim 9, wherein in the disengage mode, the moveable capper sleeve is pushed down such that the moveable capper sleeve extends beyond the capper tip and conceals the capper tip of the capper rod.

16. The capper assembly of claim 9, wherein in the disengage mode, the moveable capper sleeve is pushed down such that the moveable capper sleeve extends beyond the capper tip and conceals the capper tip of the capper rod to engage the cap with the sample tube and break a connection of the cap with the capper tip.

17. The capper assembly of claim 9, wherein the gripper fingers:
cooperate to form a cavity having a profile that fits the cap; and
pivot on the separate axes in a plane shared by the axes and the cavity.

18. The capper assembly of claim 9, wherein the thru-beam sensor senses when the cap cavity of the cap is directly aligned with the capper tip.

19. The capper assembly of claim 9, wherein the spring is a predetermined distance away from a cavity of the cap retaining mechanism.

20. A method for automated capping of a sample tube, the method comprising:
receiving a new cap from a cap track into a cap retaining mechanism, wherein the cap comprises a cap cavity that has a cylindrical inner surface along an inner diameter in a top of the cap, and an upper surface around an outside of the inner diameter on the top of the cap;
detecting that the cap is retained within a cap retaining mechanism by a thru-beam sensor, wherein the cap retaining mechanism includes two discrete, gripper fingers that are mounted on separate axes and held closed by a spring;
engaging the cylindrical inner surface of the cap cavity of the new cap that is in the cap retaining mechanism snugly against a cylindrical outer surface of a capper tip of a vertically-oriented capper rod, wherein the vertically-oriented capper rod is enveloped by a capper sleeve that is movable with respect to the capper rod, and wherein the spring is configured with a tension that holds the new cap in place between the gripper fingers until the cap cavity and capper tip are engaged;
while the cylindrical inner surface of the cap cavity is engaged to the capper tip, pushing the new cap downward from the cap retaining mechanism into an open end of the sample tube with the capper rod to cause an outer surface of the new cap to engage with an opening of the sample tube, and wherein the spring is configured with the tension that allows the gripper fingers to be driven open by passage of the engaged new cap downward; and
while the outer surface of the new cap is engaged with the inside surface of the sample tube, push the capper sleeve downward against the upper surface of the new cap to disengage the cylindrical inner surface of the cap cavity from the cylindrical outer surface of the capper tip and maintain a seal of the new cap on the opening of the sample tube during the disengagement.

* * * * *